(12) United States Patent
Petruzzelli

(10) Patent No.: US 8,528,025 B2
(45) Date of Patent: Sep. 3, 2013

(54) DRIFT COMPENSATOR FOR A TUNING DEVICE

(75) Inventor: Edmund F. Petruzzelli, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 37 days.

(21) Appl. No.: 13/361,853

(22) Filed: Jan. 30, 2012

(65) Prior Publication Data

US 2012/0135678 A1 May 31, 2012

Related U.S. Application Data

(63) Continuation of application No. 12/347,693, filed on Dec. 31, 2008, now Pat. No. 8,108,900.

(60) Provisional application No. 61/018,083, filed on Dec. 31, 2007.

(51) Int. Cl.
*H04N 7/20* (2006.01)
*H04N 7/18* (2006.01)
*H04N 7/16* (2011.01)

(52) U.S. Cl.
USPC .............................. 725/68; 725/85; 725/151

(58) Field of Classification Search
USPC .................................... 725/68, 85, 151
See application file for complete search history.

(56) References Cited

U.S. PATENT DOCUMENTS

| | | |
|---|---|---|
| 6,628,174 B2 | 9/2003 | Imaoka et al. |
| 7,203,457 B1 | 4/2007 | Wetzel |
| 7,460,628 B2 | 12/2008 | Suzuki et al. |
| 8,108,900 B2 | 1/2012 | Petruzzelli |

*Primary Examiner* — Kieu Oanh T Bui
(74) *Attorney, Agent, or Firm* — Seed IP Law Group PLLC

(57) ABSTRACT

An apparatus coupled to, or integrated with, a tuner. This apparatus, which may be referred to herein as a "compensator," may operate to adjust a frequency of the tuner to counteract drift or error that may cause the tuner to erroneously tune to an inaccurate or undesired frequency. The compensator may be implemented as hardware or software, and may be stand-alone or integrated into the tuner and/or LNBF.

12 Claims, 3 Drawing Sheets

DRIFT COMPENSATOR FOR A TUNING DEVICE

CROSS-REFERENCE TO RELATED APPLICATIONS

This application is a continuation of U.S. patent application Ser. No. 12/347,693, filed Dec. 31, 2008, titled "Drift Compensator for a Tuning Device," which application claims priority under 35 U.S.C. §119 to U.S. Provisional Application No. 61/018,083, titled "Drift Compensator for a Tuning Device," filed on Dec. 31, 2007, both of which are hereby incorporated herein in their entireties.

TECHNICAL FIELD

Embodiments generally relate to compensating for drift in a satellite signal receiving system, and more particularly to compensate for an offset drift generated by an oscillator of a tuning device.

BACKGROUND DISCUSSION

Many current satellite receiving systems employ a low noise block converter with a feed ("LNBF") to tune a satellite dish in order to receive broadcast signals at a set-top box. Oftentimes, a local oscillator circuit supplies a base tuning frequency for the LNBF and dish. The local oscillator may be, for example, a dielectric resonator oscillator ("DRO").

Over time, a DRO's base tuning frequency may drift due to age or temperature. When drift occurs, the perceived frequency of any broadcast satellite signal, as measured by a demodulator associated with a set-top box in communication with the LNBF, no longer matches the actual frequency of the broadcast. Accordingly, to the demodulator, dish and any attached equipment like a set-top box or digital video recorder, a desired transponder signal may appear to be lost when in fact the demodulator is erroneously searching for it (or tuning to it) at the wrong frequency.

In addition, such drift may be difficult to diagnose because it may be intermittent. For example, certain DROs experience excessive drift only when their operating temperature exceeds a threshold. Thus, the drift of a DRO may be sufficiently large to remove a satellite signal from a frequency band searched by the system only if the ambient temperature is over the threshold. For example, if the temperature is sufficiently cool, the drift may be low enough that the satellite signal is within the searched frequency band and therefore acquired during normal system operation. This may lead to intermittent loss of a satellite signal only on particularly hot days or afternoons, for example. It should be noted that drift may be exaggerated by either heat or cold. The transient nature of such signal loss may make it difficult to diagnose and fix such a channel loss.

SUMMARY

One embodiment generally may be an apparatus coupled to, or integrated with, a tuner. This apparatus may operate to adjust a frequency of the tuner to counteract drift or error that may cause the tuner to erroneously tune to an inaccurate or undesired frequency. The compensator may be implemented as hardware or software, and may be stand-alone or integrated into the tuner and/or LNBF.

Another embodiment takes the form of a method for compensating for drift in a satellite tuning device, including the operations of: receiving a request to tune to a channel carried on a transponder signal; determining an offset value for the transponder signal; adding the offset value to a center frequency; searching a frequency band around the center frequency; locating the transponder signal within the frequency band at a perceived frequency; setting the offset value to equal the difference between a standard frequency for the transponder signal and the perceived frequency; and storing the offset value in an entry.

The embodiment may employ an offset value that is initially zero.

The embodiment may further store a temperature with the offset value.

The embodiment may also store the offset value on a per-channel basis. Further, the offset value may be copied to at least one other entry, the at least one other entry associated with a second channel carried on the same transponder signal, satellite and/or polarity band.

DETAILED DESCRIPTION

Figure 1:
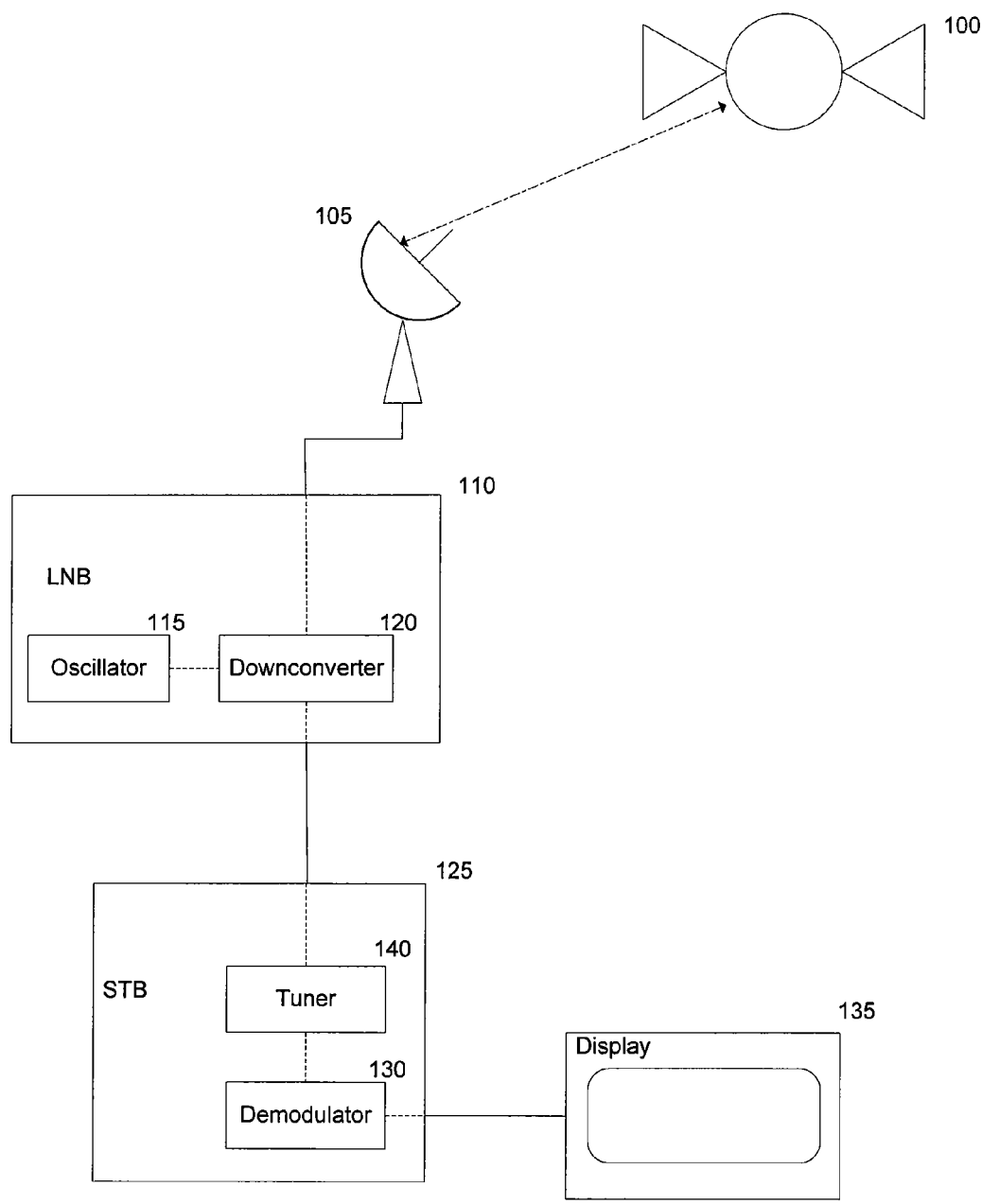
FIG. 1 generally depicts an exemplary operating environment for one embodiment.

One embodiment takes the form of an apparatus coupled to, or integrated with, a tuner. This apparatus, which may be referred to herein as a "compensator," may operate to adjust a frequency of the tuner to counteract drift or error that may cause the tuner to erroneously tune to an inaccurate or undesired frequency. The compensator may be implemented as hardware or software, and may be stand-alone or integrated into the tuner and/or LNBF.

As one illustrative and non-limiting example, a low noise block converter with a feed is often coupled to a satellite dish to receive signals broadcast by a satellite. The LNBF may include a dielectric resonator oscillator, which is tuned to a particular local oscillator (LO) frequency that serves as a frequency reference for the LNBF. This LO frequency may be used by the LNBF as a baseline for tuning to one or more particular frequencies in order to receive the broadcast signal(s). That is, the tuner may search a band of frequencies centered on a channel frequency down-converted using the LO frequency, in order to find and lock onto the satellite signal. The frequency of a given broadcast signal is generally either up- or down-converted from an expected satellite signal by the LNBF. In some cases, a low-noise block converter ("LNB"), without a feedhorn, may be used. Accordingly, references to an LNBF herein should be understood to encompass an LNB and vice versa.

However, the DRO's LO frequency may shift over time due to aging of the DRO or exposure to adverse environmental conditions, such as heat. Since the frequency band searched by the tuner is centered on the transmitted channel frequency, a sufficiently large drift in the LO frequency may cause the searched frequency band to be outside the frequency of the satellite receiver tuner. In such a case, the tuner is unable to acquire the satellite signal and considers that signal to be lost or inactive.

The present embodiment may account for drift or shift in the DRO's LO frequency by adjusting the frequency channel used by the tuner (or other tuning device). The embodiment may, for example, determine whether the satellite broadcast signal's frequency was last obtained above or below the reference channel frequency and shift the searched frequency band accordingly. For example, if the satellite broadcast signal was last registered two megahertz (MHz) below the default LO frequency, the embodiment may decrease the tuner frequency by two MHz, effectively making the new LO frequency equal the last registered broadcast signal frequency.

Alternatively, the embodiment may adjust the tuner frequency upward or downward by a fixed interval if the satellite broadcast frequency cannot be found within the frequency band searched by the tuner. The direction in which the embodiment adjusts the LO frequency is generally dependent on the value of the last received broadcast signal frequency.

It should be noted that the satellite broadcast frequency does not change, although the broadcast frequency as perceived by the tuning device varies. This occurs because most standard tuning devices presume the LO frequency of the DRO remains constant; such tuning devices effectively cannot detect the DRO's frequency drift. Thus, although to the tuning device the satellite broadcast frequency may appear to change, the broadcast frequency remains constant and such changes reflect only the amount of drift in the DRO's LO frequency. Accordingly, reference is made herein to both a "perceived frequency" and "standard frequency." The perceived frequency is the frequency, as measured by the tuner, at which the tuner detects a desired or selected channel. The perceived frequency for a channel will vary with the drift of the DRO. By contrast, the standard frequency is the frequency at which a desired or selected channel is broadcast as measured from unbiased, non-drifting equipment by the receiver's tuner.

In other words, the perceived frequency may be thought of as a local measurement by a tuner of the selected frequency and incorporates the bias/drift of the DRO. The perceived frequency is always stated throughout this document with reference to DRO and thus is relative to the tuning capabilities of the tuner; the perceived frequency is generally offset from the selected frequency by the drift of the DRO. The standard frequency is always stated throughout this document with reference to an absolute, non-biased measurement. Accordingly, given that a signal's transmission frequency generally is invariant over time, its standard frequency is likewise invariant (and equal to the transmission frequency) but its perceived frequency may change due to variables in operation such as the passage of time or environmental variables.

FIG. 1 depicts an exemplary operating environment for an embodiment. The following is intended only as a high-level overview of the environment and should not be considered a limiting technical description.

In one exemplary environment, a satellite 100 broadcasts communications signals to a satellite dish 105. Each signal is sent from a different transponder at a different frequency. A single transponder signal typically contains data for multiple channels. That is, data for each channel is modulated onto the transponder signal in manners known to those of ordinary skill in the art. Accordingly, if the tuner connected to the satellite dish 105 is tuned to receive a single transponder signal, it may receive (via the satellite dish) multiple channels on that transponder signal. These multiple channels (e.g., the transponder signal) may be downconverted en masse by the LNBF 110. Accordingly, the terms "transponder signal" and "channel signal" are used interchangeably herein.

The satellite dish 105 may be tuned to a variety of frequencies via a LNBF 110. An oscillator 115, such as the aforementioned DRO, may be used by the LNBF 110 to downconvert the incoming signal from the satellite dish 105. Generally, the satellite dish may receive signals from the satellite only if it is tuned to the signal's frequency via the LNBF 110. The oscillator 115 provides a base frequency from which the LNBF 110 may downconvert the incoming signal.

If the base frequency of the oscillator 115 is off from its anticipated or expected value, then the oscillator has "drifted" from its frequency. Such drift is generally only detectable through empirical use of the oscillator, LNBF 110 and set-top box 125. That is, if the tuner 140 tunes the set-top box 125 to a transponder frequency but the dish cannot obtain the transponder signal, one possible cause is that the oscillator 115 has drifted off its initial or expected base frequency. If the oscillator frequency drifts in this manner, the frequency to which the satellite receiver 125 is tuned by the tuner 140 is off by the amount or value of the drift. Such drift may occur due to age of the oscillator, variances in ambient temperature (especially heat), or other environmental conditions.

The LNBF 110 may transmit received signals (typically across a coaxial cable) to a set top box ("STB") 125. In particular, the signal may be received by a demodulator 130 in the STB. The demodulator 130 demodulates from the transponder signal the data for a channel selected via the STB. The demodulator 130 then broadly reconstructs the individual channel from the channel data on the transponder signal and transmits it to a display device 135 for display. Further, a user of the STB may manipulate the tuning of the tuner 140 by changing channels or selecting a new channel via the STB. In such operation, the STB signals to the tuner 140 that the user has requested the embodiment tune to another channel. The tuner 140 then retunes to detect an incoming signal on the corresponding transponder signal.

Figure 2:
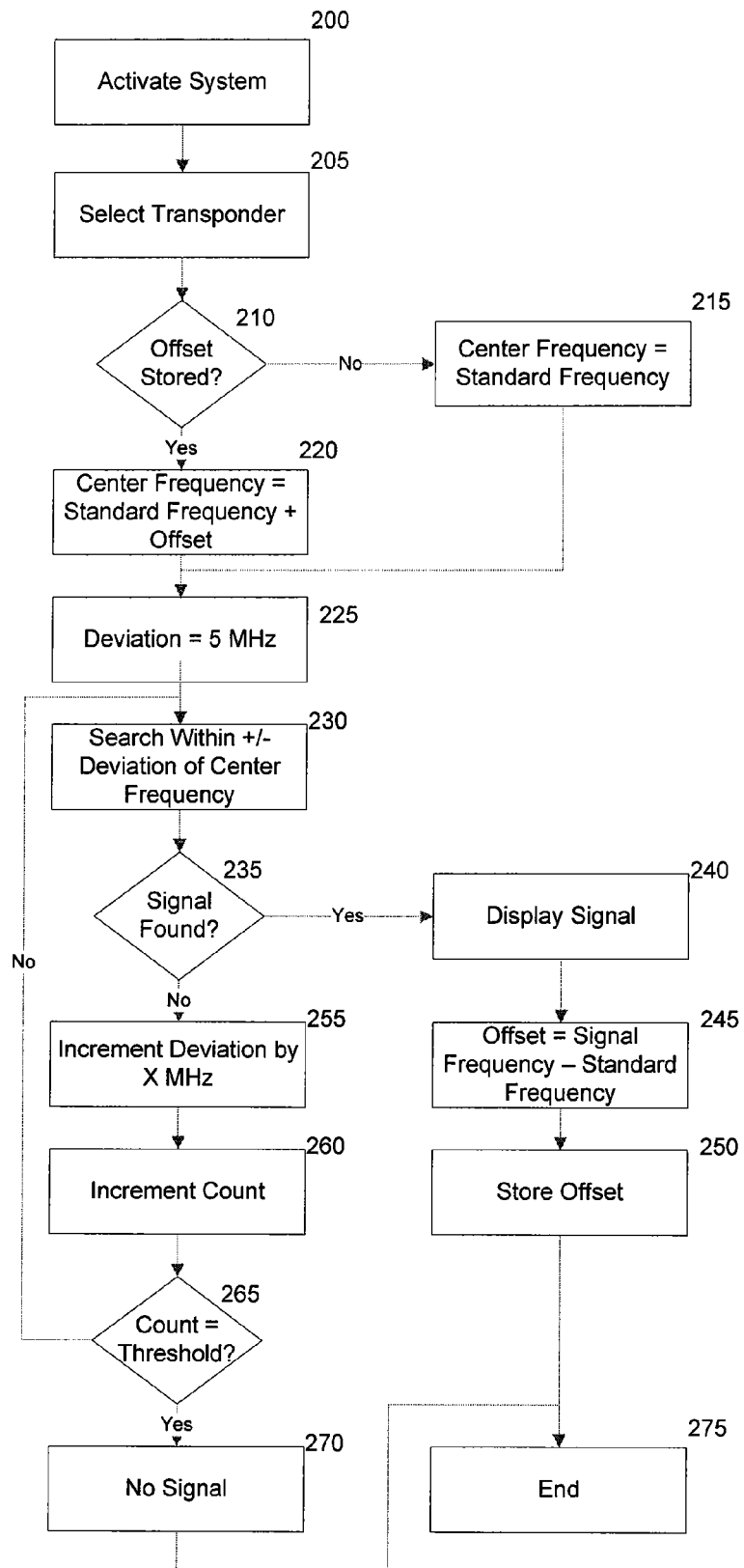
FIG. 2 is a flowchart depicting the general operation of an exemplary embodiment.

FIG. 2 is a flowchart depicting the general operation of an exemplary embodiment. The operations are initiated when the tuner is instructed to tune to the broadcast frequency or otherwise look for the broadcast signal. This may occur, for example, when a user changes channels via a STB. The STB then instructs the tuner to acquire a satellite broadcast signal corresponding to the new channel. In order to do so, the tuner may need to tune to a new frequency. (This can occur, for example, when the new channel is broadcast by a different satellite than the previous channel or on a different frequency by the same satellite.)

Generally, the flowchart depicts the operations executed to determine a frequency of a transponder signal, display the content of the signal and store the signal frequency for later use. It should be noted that certain operations set forth in the following description and on FIG. 2 may be omitted or performed in an order other than that shown. Particular, non-limiting examples of such changes to the operations of FIG. 2 are provided after the discussion of the flowchart.

The method begins in operation 200, wherein the embodiment is activated. This may occur, for example, when a STB is turned on or a command to tune to particular channel or frequency is received by the STB. Once the embodiment is active, it selects a particular transponder in operation 200. The selected transponder generally includes or transmits the signal corresponding to the desired channel or frequency, as generally indicated in operation 205. As discussed above, the local oscillator operates to translate the transponder frequency. As also discussed above, a demodulator retrieves or breaks out the information for the group of signals from the carrier wave of the transponder.

In operation 210, the embodiment determines if an offset has been previously calculated and stored. An offset is used to shift the perceived standard frequency of the selected channel. For example, if a channel is typically broadcast at 1200 MHz then 1200 MHz is the "standard frequency" for the channel. However, if the local oscillator has drifted due to age, temperature or environment, the perceived frequency of that channel may be 1205 MHz. In such a case, the offset would be 5 MHz, which is the difference between the perceived channel frequency and the standard frequency.

If no offset has been previously stored, the embodiment executes operation 215 and uses the standard frequency as a center frequency. The user of the center frequency is described in more detail below with respect to operation 230. Following operation 215, the embodiment accesses operation 225.

However, if an offset was previously stored, the embodiment executes operation 220 after operation 210. In operation 220, the embodiment sets the center frequency to equal the desired or selected channel's standard frequency plus the offset value. Thus, to continue the example above, the embodiment would set the center frequency to equal 1205 MHz (e.g., the 1200 MHz standard frequency for the selected channel plus the previously determined 5 MHz offset). The set-top box tuner is tuned to the center frequency determined in operation 220. Accordingly, the offset may at least partially compensate for drift of the local oscillator. Although the local oscillator still drives the LNBF output to an incorrect frequency, the addition of the offset compensates for the drift and sets the tuner to the proper frequency. It should be noted that the offset may be negative, in which case the perceived frequency would be lower than the standard frequency of the channel.

Next, the embodiment determines an initial deviation in operation 225. Typically, the initial deviation is a fixed value. For example, in one embodiment the initial deviation is plus or minus 5 MHz. Although the deviation is shown as being set to +/−5 MHz in operation 225 of FIG. 2, it should be understood that this is an exemplary value used by one exemplary embodiment. Accordingly, the deviation may be set to different values in alternative embodiments.

Once the deviation is set, the embodiment executes operation 230. In operation 230, the embodiment searches a frequency range for the signal carrying the desired channel (e.g., the desired signal). The frequency range searched by the embodiment generally ranges from one deviation less than the center frequency to one deviation greater than the center frequency. So, continuing the example, if the center frequency is 1205 MHz (representing a standard frequency of 1200 MHz and an offset of 5 MHz) and the deviation is 5 MHz, the range in which the embodiment initially searches for the desired signal is 1200 MHz to 1210 MHz. It should be noted that the signal or channel frequency is also the down-converted transponder frequency.

Typically, although not necessarily, the embodiment will begin searching at the center frequency and increment up and down the frequency range until the minimum and maximum frequencies are reached. Alternative embodiments may employ other search methodologies. For example, some embodiments may search from the minimum frequency of the frequency range to the maximum frequency of the range, while other embodiments may reverse this process. As still another example the frequency range may not be centered on the center frequency; the frequency range may be skewed to on side of the center frequency or the center frequency may even define a boundary of the frequency range. Accordingly, embodiments may employ any search methodology to search within the frequency range.

In operation 235, the embodiment determines if the signal has been located within the frequency range. Generally, once the signal is located, the embodiment ceases searching the remainder of the frequency range.

In the event the signal is found, the demodulator 130 (shown in FIG. 1) may demodulate the carrier signal and reconstruct the channel data as described above. The data in the desired or selected channel signal (e.g., video, audio, metadata and so forth) may be transmitted from the set top box 125 and demodulator 130 in particular to the display 135 for display as part of operation 240. The display may depict the data as another part of this operation.

In operation 245, a new offset for the selected signal is determined. The offset is set to equal the difference between the perceived signal frequency (e.g., the perceived frequency at which the signal was found in operation 235) less the standard frequency for the selected channel. In other words, the offset for any given signal is set in operation 245 to equal the drift experienced by the DRO.

Once the offset is determined and assigned, it is stored in operation 250. The offset may be stored in a table or database. Each channel on each satellite may have a unique offset entry in the table/database, so that a tuning table containing offsets for each channel may be created. In this manner, as the embodiment is tuned to multiple transponder frequencies or multiple channels are selected by a user, the embodiment may record offsets for each such channel. Later tuning to each such channel may thus occur more quickly and efficiently by employing the offset; the embodiment may use the offset in operation 220, above, to set the center frequency equal to the last known perceived frequency for the requested channel.

It should be noted that the offset may be common to a number of channels, insofar as multiple channels are carried on a single transponder signal. Thus, to the extent a second channel is known to be modulated on the same transponder frequency as the current selected channel, the offset entry for the current selected channel may be copied into the offset entry for the second channel. Alternatively, the tuning table may have entries corresponding only to transponders instead of individual channels.

After the offset is stored, the embodiment terminates the method in operation 275.

Returning briefly to operation 235, if no signal is found within the frequency range then operation 255 is accessed. In operation 255, the embodiment increments the size of the deviation. The increment size may vary arbitrarily between embodiments. For example, in one embodiment the increment may be 1 MHz and in another embodiment it may be 2.5 MHz. Incrementing the deviation permits the embodiment to search a larger frequency range in its attempt to acquire the transponder signal.

Certain embodiments may not increment the size of the deviation in operation 255, but instead maintain the same size deviation and increment the center frequency instead. Thus, the embodiment may search a band of frequencies of a constant size (for example, +/−5 MHz around the center frequency), but the upper and lower limits of this band may change with each execution of operation 255.

Following operation 255, the embodiment increments a count variable in operation 260. The count variable tracks the number of times the embodiment has unsuccessfully searched a frequency range and/or the number of times the deviation has been increased/incremented. Next, in operation 265, the embodiment determines if the count exceeds a threshold. If so, then the embodiment executes operation 270 and reports or acknowledges that it cannot locate the transponder signal. For example, the embodiment may cause the display 130 to show a "No Signal" message or may report to a transmission or troubleshooting facility that the signal cannot be located. After operation 270, the method ends in end state 275.

Instead of incrementing and checking a count variable, an embodiment may instead directly employ an incremented frequency in operations 260 and 265. For example, in an embodiment incrementing a center frequency instead of expanding the size of a deviation, the center frequency (or an upper/lower limit of the frequency band) may be checked to see if it has reached a threshold in operation 265. Further, it should be understood that the threshold may be arbitrarily set to any value desired, subject only to the limits of any hardware configured to execute the operations.

If, however, the count does not exceed the threshold in operation 265, the embodiment again executes operation 230 and searches within one deviation on either side of the center frequency. It should be noted that the deviation has been increased in operation 255 and according the size of the searched frequency range likewise increases. In certain embodiments, the embodiment may only search those portions of the frequency range that have not been previously searched in an iteration of operation 230. That is, the embodiment may only search in a band the size of the deviation increment at the top and bottom of the new frequency range.

It should also be noted that certain embodiments may omit operations 260-270 and simply search until the desired transponder signal is located. Yet other embodiments may omit operations 260 and 265, instead determining if the deviation exceeds a maximum and proceeding to operation 270 if this occurs.

Additionally, it should be noted that certain operations discussed with respect to FIG. 2 may be performed in different orders. For example, operations 245 and 250 may occur before operation 240. Likewise, operations 260 and 265 ma occur before operation 255. Accordingly, the method shown on FIG. 2 and the order of operations therein is intended to be exemplary rather than limiting.

The aforementioned tuner table and the various offset values may be stored in memory or a storage device associated with, collocated with, or contained within the set top box 120. Typically, although not necessarily, the tuner table and methodology described herein is implemented as software accessible by a processor of the set top box. In certain embodiments, the tuner table and methodology may be implemented in firmware, software or hardware. The firmware, hardware, and/or software may reside in any of the set-top box, the LNBF, and/or any of their constituent elements. Similarly, portions of such firmware, hardware, and/or software may be distributed between the set-top box, LNBF, and/or constituent elements.

In addition to storing one or more offset values in the tuner table, alternative embodiments may store additional information in each entry of the tuner table. For example, an entry for a specific channel or transponder may include not only an offset but also a temperature measured when the offset was determined. Additional entries for each channel or transponder may be generated when the offset changes or when the temperature changes. Since the drift of the DRO 115 may vary with temperature, certain embodiments may look up all entries corresponding to a selected channel or transponder and employ the offset having a temperature value most closely matching a current temperature to more precisely tune the demodulator against an expected DRO drift. Such embodiments may include a thermometer or other device for measuring temperature electronically associated with the embodiment. Likewise, alternative embodiments may record the time at which each offset is measured.

Still other embodiments may automatically report to a troubleshooting facility every time an offset is generated and stored, or whenever an offset exceeds a threshold. Such automatic reporting may facilitate dispatching of and/or repair by a technician. In this manner, a drifting DRO 115 may be diagnosed and repaired even before a customer or user of the embodiment is aware of any drift. The embodiment may likewise make the various stored offset data available to a technician for diagnosis and repair of any issues with the embodiment. As an example, certain embodiments may store not only offsets for all channels or transponders, but also the highest offset ever recorded for any channel or transponder. This latter data may be useful to a technician attempting to repair the embodiment or compensate for drift during operation in excessive temperatures or other unfavorable environments.

As yet another alternative, the embodiment may display a message on the display 130 instructing the user to call a repair center or troubleshooting facility and report the drift when an offset is generated.

Figure 3:
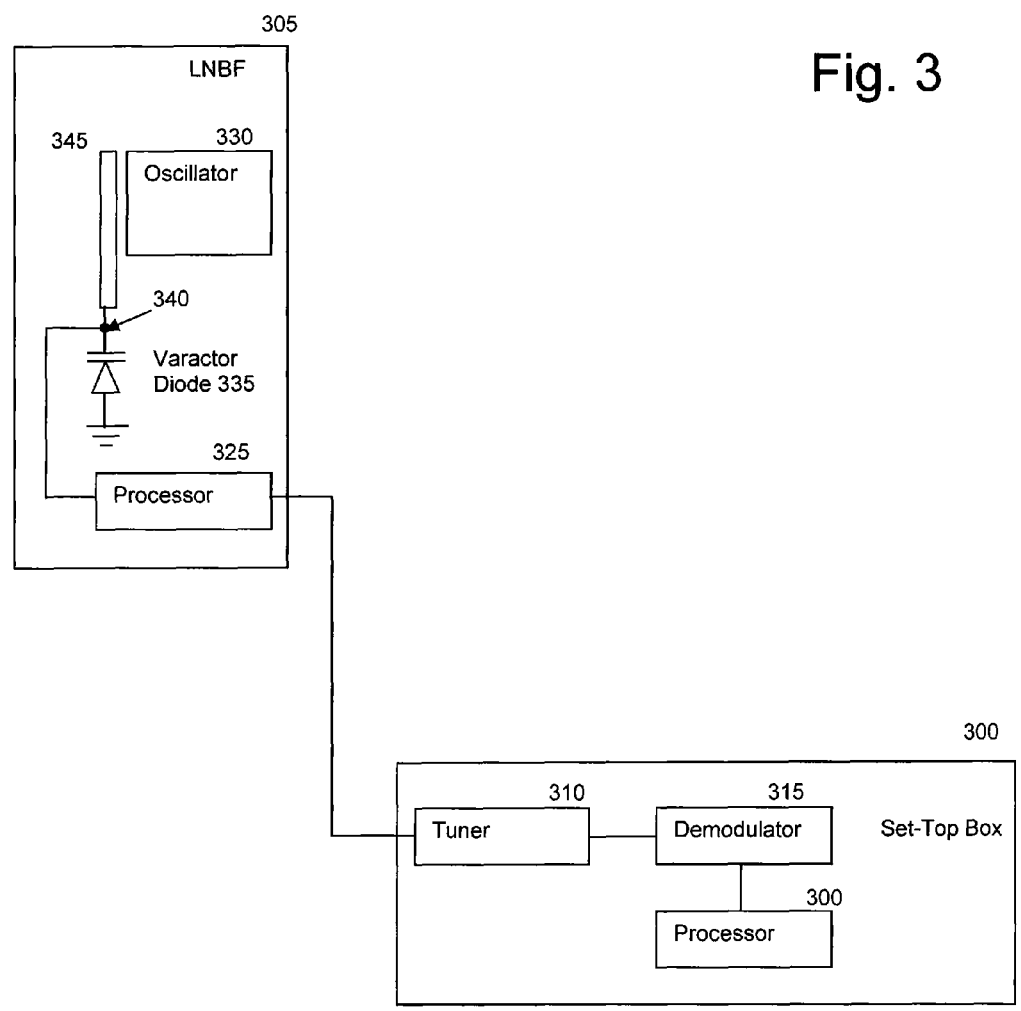
FIG. 3 generally depicts a hardware configuration of an embodiment.

FIG. 3 depicts an embodiment showing sample hardware that may be used to compensate for a drift in a local oscillator. Generally, a set-top box 300 (or other television receiver) may include a tuner 310, demodulator 315 and microprocessor 320. The set-top box 300 may be in communication with a LNBF or LNB 305 (for simplicity's sake, referred to herein as an "LNBF"). The LNBF 305 may include a LNBF microprocessor 325, a DRO 330 and a varactor diode 335.

During operation, the tuner 310 transmits commands to the LNBF microprocessor 325 via a communication protocol, such as DiSEqC or another appropriate protocol. Generally, these commands instruct the LNBF microprocessor 325 to return the DRO 330 to a nominal center frequency, which is based on a standard frequency plus a frequency offset, as generally described above. The frequency offset may be obtained by any means described herein or known to those skilled in the art. The tuner 300 may communicate with the LNBF 305 via, for example, a coaxial cable, other wired connection, or wireless connection such as BLUETOOTH, infrared frequencies, radio frequencies, wireless home networks and so forth.

For example, the frequency offset may be determined by the demodulator 315 as the signal is detected. The demodulator 315 may determine a voltage to be applied to the varactor diode 335 by the LNBF microprocessor 325. This voltage is generally proportional to the offset. That is, if the offset is 110% of the standard frequency, the voltage applied to the varactor at the intermediate node 340 (e.g., the node between the varactor diode and the DRO 330) is sufficient to tune the DRO to 110% of the standard frequency by means discussed below. Among other operations, the set-top box microprocessor 300 may control the operation of the tuner 310 and demodulator 315, including communications between such elements and the LNBF 305.

The varactor diode 335 has a capacitance that varies with the voltage applied to the varactor. Thus, as voltage is increased at the intermediate node 340, the capacitance of the varactor diode also changes. Generally, the capacitance of the varactor is inversely proportional to the square root of the applied voltage at the intermediate node. Thus, as the intermediate node's voltage increases, the varactor diode's capacitance decreases. This, in turn, effectively changes the electromagnetic fields coupling the tuning stub 345 to the DRO 330, thereby changing the DRO's frequency. That is, the varactor diode 335 capacitively loads the tuning stub 345, which makes the electrical field of the tuning stub appear longer and thereby changes the electrical coupling to the DRO. This retunes the LO frequency of the DRO to match the prior LO frequency plus the frequency offset.

Certain embodiments may take a dual hardware/software approach to locating a transponder signal as discussed herein. For example, an embodiment may initially employ hardware, such as that discussed with respect to FIG. 3, to search for a transponder signal. When the tuning limits of the varactor diode are reached, the embodiment may employ software to continue searching. IN such an embodiment, the center frequency used initially by the software may fall within the final band of frequencies searched by the hardware or may be equal to the center frequency last searched by the hardware plus one deviation.

The foregoing has been generally described with respect to a set-top box. However, it should be appreciated that the various embodiments may be implemented in or with other television receivers, such as a cable box, digital video recorder or other suitable technology. Accordingly, although this description specifically discusses set-top boxes, it is intended to generally encompass these other television receivers, as well.

It should be appreciated that the method and operations described herein, may be executed by appropriately configured hardware, such as an integrated circuit or one or more electronic components, or by a processor or other computing device/system configured to execute software that performs the aforementioned method and/or operations. For example, a dedicated circuit may be implemented in a set-top box to provide the functionality disclosed herein.

In conclusion, various embodiments have been described with respect to particular apparatuses and methods. It will be appreciated by those of ordinary skill in the art that the hardware, software, apparatuses and methods described herein may be modified and changed without departing from the spirit and scope of the embodiments disclosed herein. For example, a different type of oscillator other than a DRO may experience drift and thus may be corrected by a properly-implemented embodiment. As yet another example, an embodiment may be employed in a system receiving a terrestrial transmission or transmission other than from a satellite or at a frequency not typically used to transmit satellite programming. As still another example, an embodiment may be incorporated into a stereo receiver, media center, computing device, digital versatile disk player, television, monitor, or any other type of audiovisual or electronic equipment other than a set top box. As still another example, an embodiment may be a stand-alone device plugged into a STB or other equipment. Accordingly, the proper scope of the invention is defined by the following claims.

I claim:

1. An apparatus for compensating for drift in a satellite tuning device, comprising:
   a tuner configured to tune to a channel carried on a transponder signal;
   a compensator associated with the tuner, the compensator configured to:
      determine an offset value for the transponder signal;
      add the offset value to a center frequency;
      searching a frequency band around the center frequency within a deviation of a first size;
   the compensator further configured to execute the following actions in the event that the transponder signal is located within the frequency band at a perceived frequency:
      set the offset value to equal the difference between a standard frequency for the transponder signal and the perceived frequency; and
      store the offset value in an entry; and
   the compensator further configured to execute the following actions in the event that the transponder signal is not located within the frequency band at the perceived frequency:
      increment the size of the deviation such that the deviation is a of second size;
      search the frequency band around the center frequency within a deviation of the second size;
      locate the transponder signal within the frequency band at the perceived frequency;
      set the offset value to equal the difference between a standard frequency for the transponder signal and the perceived frequency; and
      store the offset value in an entry.

2. The apparatus of claim 1, wherein the offset value is initially zero.

3. The apparatus of claim 2, wherein a temperature is stored with the offset value.

4. The apparatus of claim 2, wherein:
   the offset value is stored on a per-channel basis; and
   the offset value is copied to at least one other entry, the at least one other entry associated with a second channel carried on the same transponder signal.

5. The apparatus of claim 1, wherein the frequency band is centered on the center frequency.

6. The apparatus of claim 1, wherein the frequency band asymmetrically encompasses the center frequency.

7. The apparatus of claim 1, wherein the center frequency defines a boundary of the frequency band.

8. A apparatus for compensating for drift in a satellite tuning device, comprising:
   a tuner configured to tune to a channel carried on a transponder signal;
   a compensator associated with the tuner, the compensator configured to:
      search in a frequency band centered on a center frequency for a signal;
      in the event the signal is not located, increment the center frequency by a deviation value to yield an adjusted center frequency;
      search a second frequency band around the adjusted center frequency for the signal;
      locate the signal within the adjusted center frequency;
      set the deviation value to equal the difference between a standard frequency for the signal and a frequency at which the signal was located; and
      store the deviation value.

9. The apparatus of claim 8, wherein in the operation of incrementing the center frequency by a deviation value the compensator applies a voltage to a variable capacitor, to thereby adjust a frequency of an oscillator resonating at the center frequency.

10. The apparatus of claim 9, further comprising:
   a demodulator;
   wherein the compensator is further configured to receive, from the demodulator, the standard frequency for the signal, and to set the center frequency of the frequency band to the standard frequency for the signal.

11. The apparatus of claim 8, wherein in the operation of incrementing the center frequency by a deviation value the compensator is further configured to adjust a software value for the center frequency.

12. The apparatus of claim 8, wherein the deviation value is stored on a per-channel, per-satellite basis.

* * * * *

UNITED STATES PATENT AND TRADEMARK OFFICE
CERTIFICATE OF CORRECTION

PATENT NO. : 8,528,025 B2  
APPLICATION NO. : 13/361853  
DATED : September 3, 2013  
INVENTOR(S) : Edmund F. Petruzzelli Page 1 of 1

It is certified that error appears in the above-identified patent and that said Letters Patent is hereby corrected as shown below:

In the Claims

Claim 1, Column 10, Lines 5-6:
"increment the size of the deviation such that the deviation is a of second size;" should read, --increment the size of the deviation such that the deviation is of a second size;--.

Claim 8, Column 10, Line 30:
"8. A apparatus for compensating for drift in a satellite" should read, --8. An apparatus for compensating for drift in a satellite--.

Signed and Sealed this  
Fourth Day of March, 2014

Michelle K. Lee  
*Deputy Director of the United States Patent and Trademark Office*